United States Patent [19]

Moore et al.

[11] Patent Number: 5,743,437
[45] Date of Patent: Apr. 28, 1998

[54] CLOSURE FOR CONTAINERS FOR LIQUID

[75] Inventors: David Moore, Elmesthorpe; Christopher Harris, Oakham, both of United Kingdom

[73] Assignee: Monsanto Europe S.A., Brussels, Belgium

[21] Appl. No.: 272,187

[22] Filed: Jul. 8, 1994

[30] Foreign Application Priority Data

Jul. 8, 1993 [EP] European Pat. Off. ............ 93870128

[51] Int. Cl.⁶ .................................................. B65D 49/02
[52] U.S. Cl. .................. 222/147; 215/21; 222/153.07; 222/547
[58] Field of Search .................. 222/147, 153.07, 222/547, 564; 215/14, 18, 19, 21, 25–30, 44, 45, 252, 256, 266–268, 311, 312, 315

[56] References Cited

U.S. PATENT DOCUMENTS

| 2,078,251 | 4/1937 | Jesnig ............................ 215/26 |
| 2,110,261 | 3/1938 | Ciucci ............................ 215/25 |
| 2,673,655 | 3/1954 | Greene ........................ 215/28 X |
| 2,835,411 | 5/1958 | Scheminger, Jr. ............. 222/147 |
| 3,179,300 | 4/1965 | Davidson et al. ............. 222/213 |
| 3,399,811 | 9/1968 | Miller ............................ 222/147 |
| 4,232,795 | 11/1980 | Vigna ............................. 215/21 |
| 4,382,520 | 5/1983 | Aleff ............................. 215/21 |
| 4,458,817 | 7/1984 | Guala ............................ 215/21 |

FOREIGN PATENT DOCUMENTS

| 692600 | 8/1964 | Canada ........................... 222/147 |
| 471256 | 10/1914 | France . |
| 4008442 | 9/1991 | Germany . |
| 643759 | 8/1962 | Italy ............................... 222/147 |
| 189456 | 5/1964 | Sweden .......................... 222/147 |
| 700127 | 11/1953 | United Kingdom . |
| 914311 | 1/1963 | United Kingdom . |
| 1138326 | 1/1969 | United Kingdom . |
| 1245034 | 9/1971 | United Kingdom . |
| 2236999 | 4/1991 | United Kingdom . |

Primary Examiner—Kevin P. Shaver
Attorney, Agent, or Firm—Jon H. Beusen; Stanley M. Tartar; Arnold, White & Durkee

[57] ABSTRACT

A reusable closure for placement within the neck of a returnable and reusable container for liquid includes an improved sealing device for preventing contamination of the container. The sealing device achieves a tight seal between a ball and a valve seat within the closure. A cap abutment or spring may optionally be provided to further enhance the tightness of the seal.

12 Claims, 9 Drawing Sheets

CLOSURE FOR CONTAINERS FOR LIQUID

The present invention relates to an improved reusable closure, intended for returnable and reusable containers for liquid, such as containers for herbicides, insecticides or other regulated products.

In general, the chemical industry is looking for more environmentally friendly packs and for a reduction in the consumption of synthetic materials such as plastic materials in the packaging of different products including herbicides, insecticides . . . etc.

Moreover, relevant authorities more and more discourage the users of such packs from burning the residual empty packs and/or encourage or even oblige the supplier of such packs to accept empty packs returned to them by the users. As a consequence the industry has started to turn its attention to reusing empty packs rather than destroying them or recycling the pack material.

One problem posed by the repeated use of such packs or containers relates to the closure system used on the pack or container. Single trip closure systems (used only once) are generally not suitable. Furthermore, the closure system needs to remain integral once the pack or container has been opened if it needs to be reused later. In addition, the closure system should be suitable for repeated uses during the lifetime of the returnable container.

Another problem relates to the possible contamination of the returned pack or container by products for which the pack or container was originally not intended. The industry may foresee a cleaning and/or rinsing of the pack or container before refilling with the same liquid product it was originally intended for, in order to comply with regulations in that respect. Such cleaning and/or rinsing processes are, however, expensive and require the industry to invest in cleaning and rinsing equipment which increases the total cost of packaging, and increase the cost of the product sold to the customer.

There is thus a need for improved closure systems that are suitable for repeated uses during the lifetime of a returnable and reusable container, and that prevent contamination of the container during repeated uses thereof with products said container was originally not intended for.

Moreover, such an improved closure system should allow for rapid emptying of the product from the returnable container, preferably without splashing of liquid during the pouring operation, and possibly with controlled air entry to prevent or reduce glugging.

The aim of the present invention is to provide an improved closure system that fulfills the requirements described above, and which may be arranged in a common (standard) 63 mm neck opening which is used widely in the pesticides industry.

FR-A-471 256 discloses a non refillable bottle comprising, in its gullet or mouth, a closure which consists of a ball valve of a particular structure. Such a closure is not suitable for a returnable container of chemical products such as pesticides which need to be refilled at a filling station and which need to be emptied in a rather short period of time without splashing of product.

U.S. Pat. No. 3,179,300 discloses a dispensing valve for squeezable tubes, such as tubes for dispensing tooth paste, shaving cream or others. The object here is to provide a valve arrangement which allows the tube content to be dispensed but which prevents air from entering the tube after the squeezing operation. The tube with its dispensing valve may be closed by a cap which has cylindrical side walls provided with internal threads adapted to mesh with the threads of the tube neck, and a top wall integral with the side walls, from which extends a plunger down into engagement with the ball valve. In operation, when the cap is screwed in place, the plunger urges the ball against its valve seat. Again, the arrangement disclosed is not suitable for a returnable and refillable container which, in addition, needs to be emptied rapidly.

GB-A-700 127 relates to non-refillable bottle closures comprising a disc valve of a particular structure. The arrangement disclosed is, however, not suitable for refillable pesticide containers that need to be emptied rather rapidly without splashing of product.

GB-A-1 138 326 relates to an anti-filling cap for closure of a container. The objective of the invention is to prevent the blocking of a weighted valve in its seating. In order to solve this problem, the cap for closure of the container having an opening includes a fixed part applicable to the opening, a moveable valvular member mounted in the fixed part operable by the force of gravity to prevent introduction of material into the container, and a cover engageable with the fixed part and moveable valvular member by means of helical threading, the threading for engagement of the moveable valvular member with the cover and the threading for engagement of the fixed part with the cover being oppositely directed.

The skilled person would not have turned to this document when looking for a solution to his problem of providing a closure for returnable and refillable containers for pesticides for instance, that need to be emptied rapidly without splashing.

U.S. Pat. No. 2,078,251 also relates to a closure of the non-refillable type which comprises a valve member of a particular shape seated gravitationally in its valve seat and a valve stop. Again, this closure does not allow for rapid emptying of the container without splashing of product.

GB-A-2 236 999 discloses a non-refillable bottle fitment including a tubular sleeve having a first outwardly extending annular flange adapted to engage lip portions of the neck of the bottle and a second, inwardly and downwardly extending, resilient flange which defines an aperture closeable by a ball weight. The ball weight lifts away from a sealing contact with the flange when liquid is to be poured and the bottle is tilted. A ball-retaining and positioning device has shearable marginal portions by which it is loosely held captive in the sleeve above the valve. Tampering attempts which involve drilling or other attempts to form a passage through the device causes rupture of the marginal portions and forcing down of the ball, which is pushed through its central aperture into the bottle where it can be seen or heard rattling, and from where it cannot be retrieved without visible damage to the closure. This document does not address the problem of rapid pouring without splashing of product.

DE-A-40 08 442 discloses in rather general terms a valve system for containers, comprising a valve member, like a ball, a flap or conical valve member, and a spring member retaining the valve member in its seat. Said document does not address the problem of the present invention.

The present invention provides an improved closure that essentially comprises a main valve body adaptable on a container neck comprising a valve means sealingly engageable by gravity, and optionally assisted by a spring means, in a corresponding valve seat, a retention means for the valve means and tamper evidence means between the main valve body and the container neck. According to the invention, said closure is associated with a flow control element which comprises an essentially cylindrical extension of the main valve body, which extends into the container and which comprises, at the end opposite to the valve body, a product flow orifice, at least one air flow orifice, and optionally, at the valve body end, one or at least two spaced drain holes.

According to the invention, when the container is placed in an essentially upright position or in a position inclined to the upright position according to an angle of essentially less than 90°, the valve means is moved by its own weight and/or by a spring means against its valve seat and does not allow the contamination of the container by introduction of a liquid or solid flowable product. An attempt to pour the contaminant into the container would fail, because the valve means sealingly engages the valve seat due to its own weight and/or due to a spring means acting in the direction to assist sealing, and because the pouring of contaminant would exert additional pressure on the valve means, even more tightly sealing the valve means in the valve seat, thus avoiding penetration into the container.

On the other hand, when the user sufficiently inclines or inverts the container to pour out the contained product, the gravity and/or the product pressure on the valve means moves said valve means away from its valve seat. The opened valve means now allows product flow between the valve seat and the valve means. In order to avoid the valve means moving away from its valve seat and falling out of the main valve body in the inclined container position, an appropriate retention means is foreseen accordingly.

The flow control element essentially improves the pouring quality and may also reduce the time for emptying the relevant container. It is designed to maintain an air pathway open right through the valve and to control the entry of air into the container in order to render the product flow more uniform, thus reducing glugging and reducing or preventing splashing of product, and also increasing the actual flow rate.

The main valve body may, of course, be protected by a cap which is adaptable on the said main valve body, e.g. by thread means, ratchet means or other suitable means.

In order to make sure the user of a container equipped with the closure of the present invention does not contaminate the container by unlocking the whole closure system from the container, tamper evidence means may be foreseen between the main valve body and the container neck.

Such a tamper evidence means may comprise two distinct tamper-evidence areas which indicate (a) removal of the cap from the main valve body (the normal method of emptying the container), and (b) removal of the main valve body from the container neck (allowing pack contamination and refilling of the container).

According to a preferred embodiment of the present invention, the cap which is adaptable on the main valve body comprises an abutting means intended to maintain the valve means in firm sealing engagement with the valve seat, regardless of the position of the container, in order to avoid product flowing past the valve out of the container when said container is inverted or inclined with mounted cap.

Said cap may advantageously also comprise a sealing means which acts in association with corresponding parts of the main valve body. The purpose of such sealing means is to play the role of an additional safety measure to avoid leakage of product, e.g. during transportation of filled containers.

According to a preferred embodiment of the present invention, the valve means consists of a ball valve and the valve seat consists of a circular opening, the rim of which is provided with sealing means, such as an O-ring for instance.

In order to ensure proper and accurate operation, particularly the reclosing of the valve means, the ball valve may be guided along a track which may advantageously consist of at least three preferably regularly spaced ribs, integral with the wall of the main valve body. This arrangement also prevents the ball from entering the main flow path of the product and so promotes free pouring of product.

A requirement by the users of such containers is that pouring should empty the container in a short period of time, e.g. a 10 liter container should be emptied in a time period of less than one minute and preferably less than thirty seconds. The pouring rate is dependent upon the ball valve diameter, the valve seat diameter, the length of the guiding track, and the internal arrangements. The said track may be axial or contoured and ramped with regard to the axial center line of the closure system. If ramped, the ball valve in rolling forward rises above the center line of the closure and is therefore more completely removed from the product flow, thus further promoting and allowing free pouring of product.

In this embodiment of the invention, the retention means may consist of a grille arranged at the top of the main valve body. Said grille may be rigid and provided with an opening intended to allow the action of the said abutting means of the cap through the grille. In another embodiment of the invention, the grille may be flexible thus allowing the cap abutting means to act against the ball valve.

Advantageously the main valve body may be equipped with a ball valve arranged within the container neck opening. This arrangement keeps the main valve body in a protected position and allows a compact container design with a normal neck height.

According to a different embodiment of the present invention, the valve means consists of a flap valve and the valve seat consists of a shoulder which is part of the main valve body and which is provided with sealing means, such as an O-ring or a similar resilient material seal. In order to ensure accurate working of the flap valve it may be guided in its opening or closing movement. Guiding means may comprise radial extensions of the flap, adapted for sliding engagement with corresponding grooves arranged in the wall of the main valve body, or for sliding movement against said wall.

In order to promote the free flowing of product when the container is sufficiently inclined, the flap valve which is preferrably round may be provided with apertures on the periphery of the flap at a radial distance from the axial center line of the closure, which is greater than the radial distance of the seat seal. Pursuant to another arrangement, the flap may comprise radial extensions spacing the flap border line from the wall of the main valve body.

The present invention provides that the flap valve may be a free moving relatively heavy flap able to seal by gravity; in such a case, the valve retention means may consist of abutment means arranged in the said grooves for sliding guidance of said flap or on the wall of the main valve body; or the retention means may consist of a grille arranged at the top (in the normal upright container position) of the main valve body. As already disclosed earlier, such a grille may be rigid and provided with an opening for the cap abutting means or may be flexible, so as to allow the cap abutment means to act upon the valve means.

The present invention also provides that the flap may be a relatively light flap, e.g. made from plastic material; in such a case, the flap valve is retained in sealing arrangement with the valve seat by a spring means reinforcing the effect of gravity. A grille as described hereabove may be provided as retention means and as in the other embodiments as a protection of the valve system against contaminant, and attempted tampering with the valve. Such a grille also prevents the user from opening the container by removing the valve means.

Such a spring is preferably fixed, by its end opposite the one fixed to the flap valve, to a support means, like a spider or yoke arranged below the flap valve (seen in normal container position).

The main valve body equipped with the flap valve as hereabove described may of course be arranged within the container neck. It is, however, preferably arranged on the top of the container neck in order to achieve the largest opening for product flow.

Since the main valve body constitutes the main part of the closure and is intended to close the container, a seal should be arranged between the main valve body and the container neck, preferably on the neck rim.

The present invention allows all parts of the closure to be re-used, with the sole exception, of course, of the tamper evidence means which is replaced at the refilling site each time the pack is re-filled.

The invention is disclosed in more detail by way of the description following hereafter with reference to the corresponding Figures in which.

Throughout the description, like reference numerals indicate like elements and primed reference numerals refer to elements that are similar but not identical to their unprimed counterparts.

Figure 1:
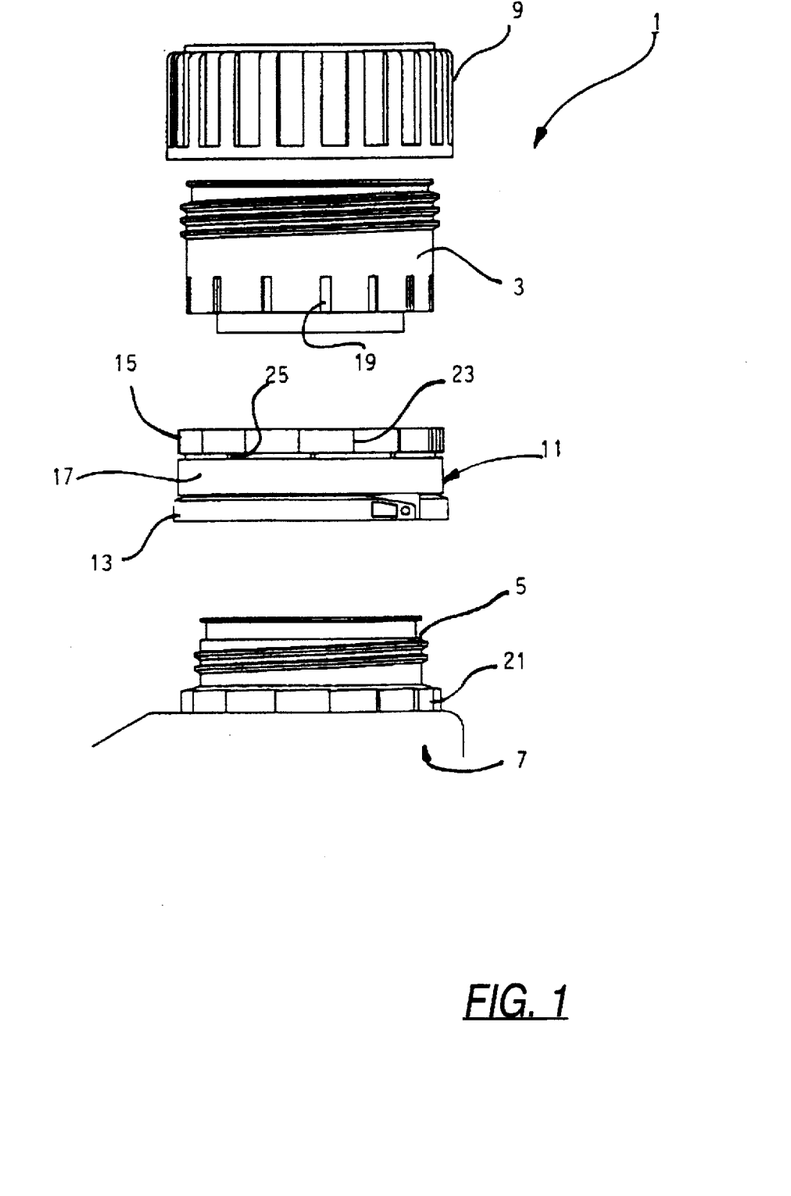
FIG. 1: is a schematic view of the different parts of the closure according to the invention except the flow control element.

Referring to FIG. 1, the closure 1 comprises a main valve body 3 which is equipped with a valve means and corresponding valve seat and a retention means for the valve means. The main valve body 3 is adapted to be arranged on the neck 5 of a container 7, for instance by thread means as represented in FIG. 1. Furthermore a cap 9 may be arranged, preferably screwed on the main valve body 3. In addition, tamper evidence means 11 may be foreseen. The tamper evidence means 11 as shown on FIG. 1 combines two tamper evidence areas. A first area 13, if broken, indicates that the main valve body may have been removed from the container neck 5; a second area 15, if broken, indicates that the cap 9 has been unscrewed and that product may have been poured out of the container 7. Such tamper evidence means may consist of means known in the art. In the example of FIG. 1, the tamper evidence means has three axial segments the tamper evidence ring 13, a center segment 17 and the tamper evidence ring 15. The tamper evidence ring 15 and the center segment 17 axially slide onto the main valve body 3. The center segment 17 is provided with internal splines which key with corresponding grooves 19 in the external surface of the main valve body 3 and prevent the relative rotation between these two elements. The tamper evidence ring 13 has an internal ratchet form which engages with an external ratchet 21 of the container. This ratchet allows the main valve body to be screwed onto the container, but prevents the valve body being unscrewed without damaging the ring. However, ring 13 is in the form of a tear-off ring which may be removed from the remainder of the tamper evidence means 11 by means of a discreet pull-tab. Once the ring 13 is removed, the main valve body can be unscrewed. The tamper evidence ring 15 has an external ratchet form 23 which engages with an internal ratchet on the cap 9. This ring is more weakly connected to the center segment 17, e.g. by means of several narrow plastic pillars 25. The ratchet may allow the cap to be fitted without damage to the pillars. However, when the cap is removed, the pillars are sheared so that the ring 15 becomes loose. Furthermore, the center segment with its tamper evidence ring 13 mechanically locks the main valve body 3 on the container neck in such a way as to resist unscrewing of the main valve body when this is attempted as a deliberate action and when unscrewing the cap from the main valve body.

To refill a used container, the operator at the refilling site pulls the tab (using a tool) and tears off the ring 13. He then removes the main valve body (with cap) and fills the container. The used tamper evidence means is removed by sliding it off the end of the main valve body, and it is replaced by another. The whole assembly is then refitted to the container 7.

Figure 11:
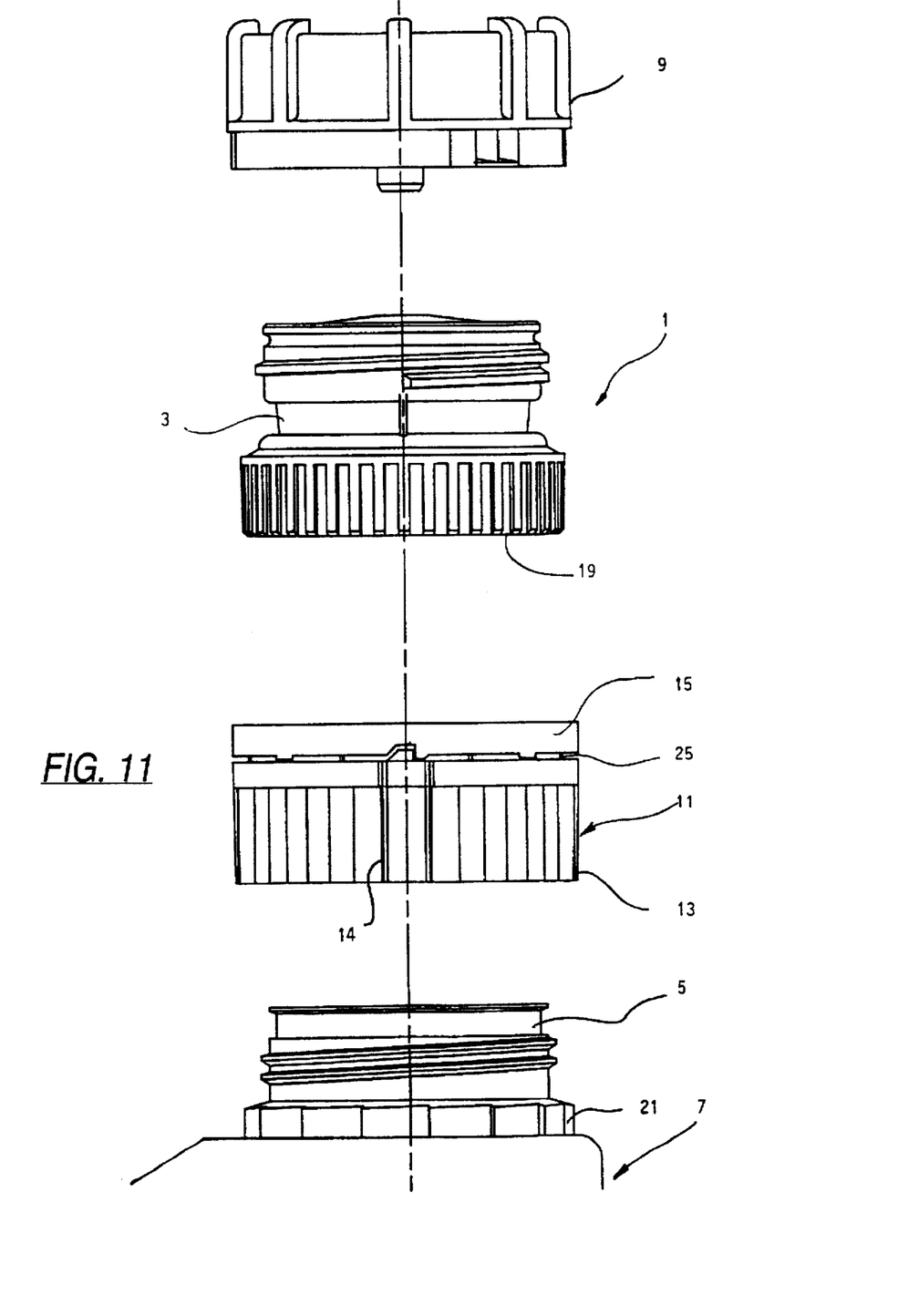
FIG. 11: is a schematic view of a different embodiment of the closure of the invention, the flow control element being omitted.

FIG. 11 represents a different embodiment of the invention, the flow control element being omitted for reasons of clarity. The tamper evidence means 11 here also combines two tamper evidence areas: a first area 13 and a second area 15. In the example of FIG. 11, the tamper evidence means only has two axial segments, the tamper evidence ring 13 and the tamper evidence ring 15. The assembly 13–15 axially slides onto the main valve body 3. The ring 13 is provided with internal splines which key with corresponding grooves 19 in the external surface of the main valve body 3 and prevent relative rotation between these two elements. Ring 13 has an internal ratchet form which engages with an external ratchet 21 of the container 7 as in FIG. 1. The ring 13 may be removed by breaking it along an axial weakness line 14. As in the embodiment of FIG. 1, once the ring 13 is removed, the main valve body can be unscrewed. The tamper evidence ring 15 is essentially similar to ring 15 of FIG. 1, except that it has internal ratchet teeth and is directly connected by pillars 25 to ring 13. Moreover, ring 13 mechanically locks the main valve body 3 on the container neck in order to resist unscrewing of the main valve body when unscrewing of the cap.

Similarly to the operation at the refilling site described in relation with FIG. 1, the operator, in this case, breaks the ring 13 along the weakness line 14, e.g. by means of a screw driver, and then removes the main valve body (with cap) in order to refill the container. A new assembly 13–15 is then slid on the main valve body 3, and the whole closure is refitted to the container 7.

The flow control element and its function are described in more detail later on.

Figure 2:
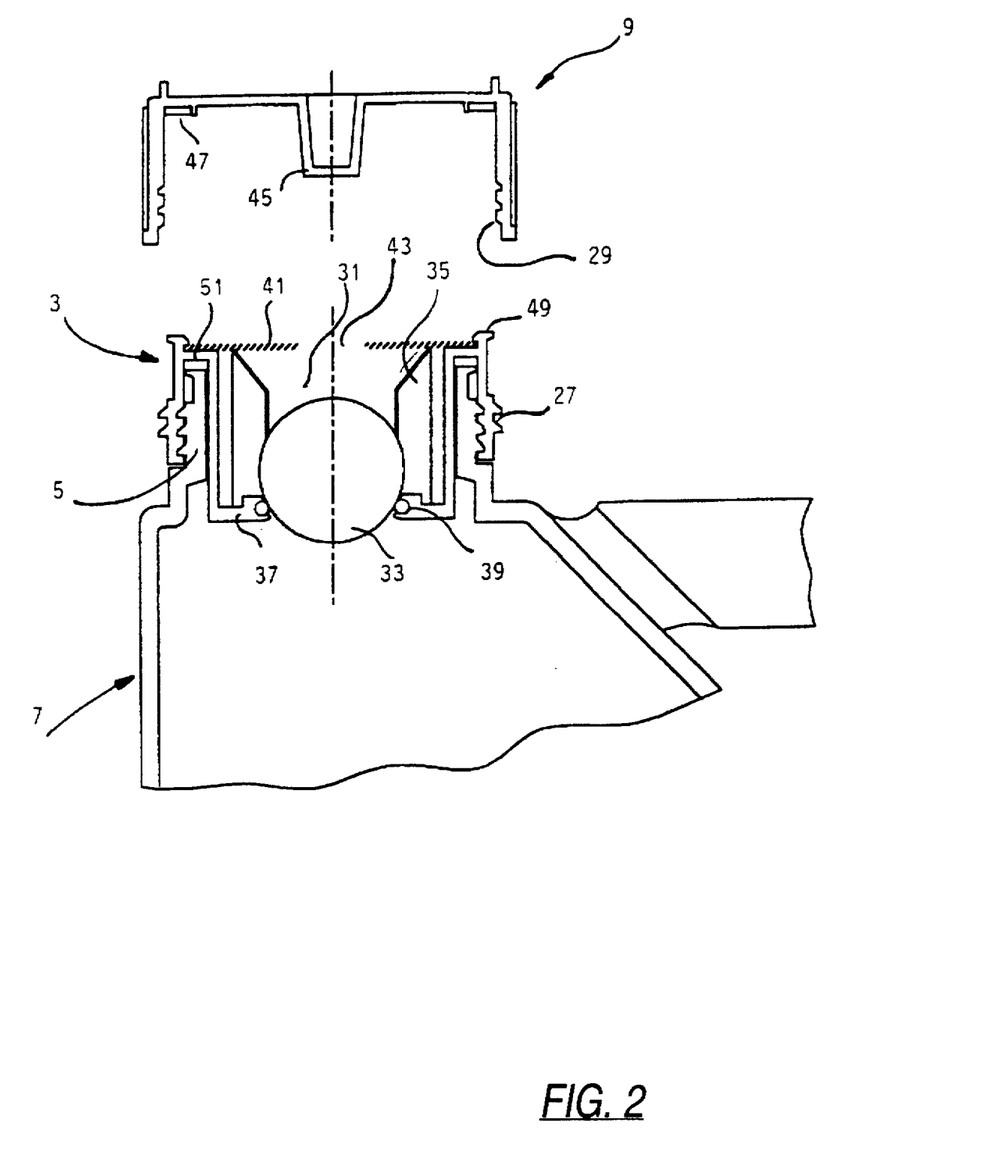
FIG. 2: represents a first embodiment of the closure according to the invention, comprising a ball valve, the flow control element being omitted.

Turning now to FIG. 2 which represents schematically a first embodiment of the closure of the present invention; the main valve body 3 is mounted on the neck 5 of the container 7, the essential part of the main valve body 3 that is the actual valve system, here a ball valve, being arranged within the neck and being equipped with an external thread 27 adapted to receive an internal thread 29 of a corresponding overcap 9. According to the example of FIG. 2, the main valve body is screwed on the container neck 5. Different assembling means may, however, be foreseen as well, such as ratchet means and the like. The tamper evidence means shown in FIG. 1 is not represented in FIG. 2 for reasons of clarity. It is, however, understood that such tamper evidence means may be arranged correspondingly on the embodiment of FIG. 2.

The main valve body further comprises a ball valve chamber 31 within which a ball valve 33 is arranged so as to be able to roll along a track consisting of e.g. three radially equally spaced ribs 35. The ball valve 33 is seated by gravity upon a valve seat 37 which consists of a rim 37 provided with a sealing O-ring 39. In addition, the main valve body comprises a grille 41 with an opening 43 which prevents the ball 33 from passing through it.

The cap 9 adapted to be screwed on the main valve body 3 bears an internal boss 45. Said boss 45 serves as abutting means for the ball valve 33 and acts through the grid opening 43 on the ball 33, thus maintaining the ball in the sealing position when the cap is screwed on, in any position of the container 7. In addition said cap 9 comprises a sealing ring 47 which creates an auxiliary seal between the cap 9 and the top rim 49 of the main valve body 3, which prevents leaking of the container 7 during transportation for instance.

Another seal needs to be provided between the container neck 5 and the main valve body 3. Such a seal may consist of a sealing ring 51 arranged on the top rim of the container neck 5 and acting between said neck rim and the part of the main valve body 3 which covers said rim. An additional seal or indeed the main seal may be provided between the inner wall of the container neck 5 and the outside surface of the inner wall of the valve chamber 3. A convenient way of performing a seal there is to design the assembly according to a suitably defined angle.

Figure 3:
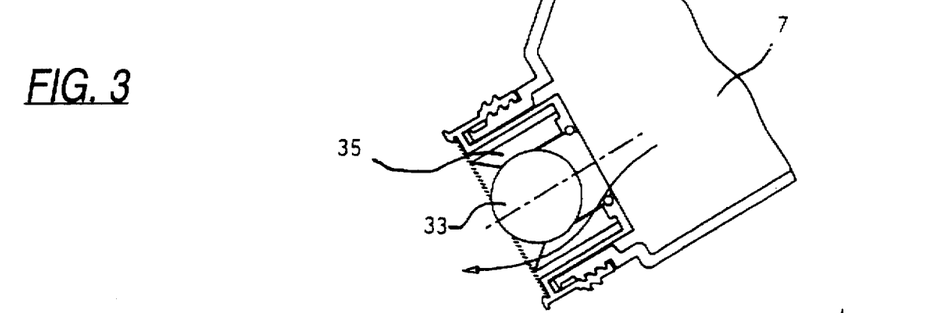
FIG. 3: shows the ball valve in open position when product is poured out of the container.
Figure 4:
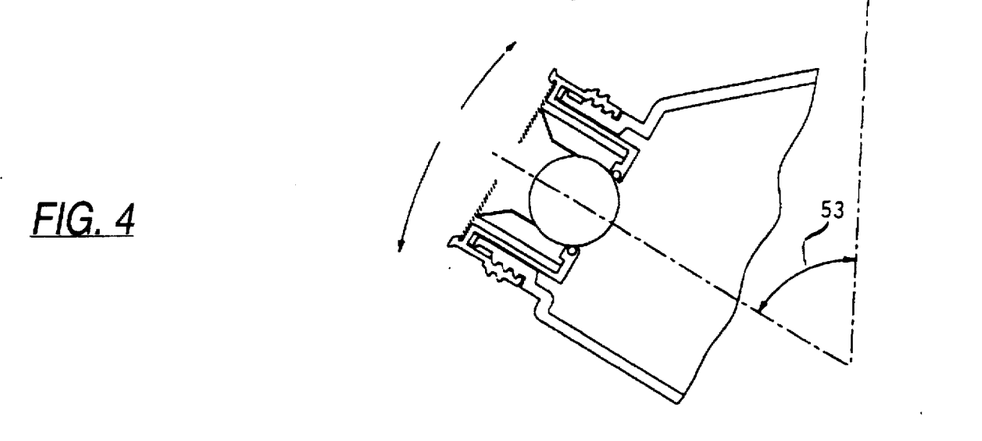
FIG. 4: represents the limit inclination at which the ball valve opens.

Reference is now made to FIGS. 3 and 4 to explain the mode of operation of the valve closure according to the present invention. As already mentioned earlier, the ball valve closes the opening created by the valve seat 37 simply by gravity. It should therefore be of a sufficient weight; a stainless steel ball has appeared to be appropriate for such a closure. When the user inverts the container 7, the ball rolls along the ribs 35 until it abuts the grille 41 which prevents the ball 33 from falling out of the main valve body 3. In rolling along the ribs 35, the ball 33 opens a flow passage for the product contained in the container (see the arrow in FIG. 3). The ribs 35 permit the ball valve to open and close well in repeated uses and also prevent the ball 33 from falling into the main flow passageway and hindering proper product flow.

It is to be understood that when the container is being inclined, the ball 33 may move away from its seat not only due to gravity but also due to the liquid pressure of the product.

Figure 5:
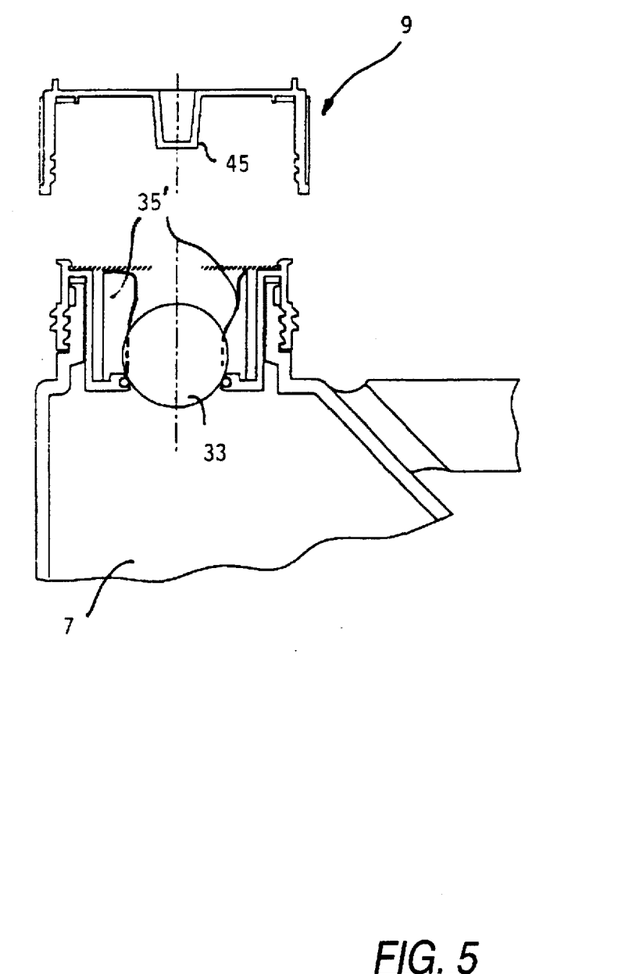
FIG. 5: represents another variant of the ball valve closure, which is similar to FIG. 2.

The critical angle of inclination 53 at which the ball rolls back onto its seat under gravity should be as high as possible in order to prevent as far as possible contamination of the container by introduction of product or products it was originally not intended for. An angle of more than 60° has been found advantageous. Such an angle may even be increased by use of a diametral sealing upon the ball, or by use of a contoured and ramped track as represented in FIG. 5. In FIG. 5, the ribs 35' are contoured in a complementary way, hence creating a guiding track for the ball 33 which in the orientation shown directs the ball 33 onto the valve seat 37. Such a contoured and ramped track moves the ball 33 further outside the main flow passage way and allows a faster pouring rate when the valve is open.

Figure 6:
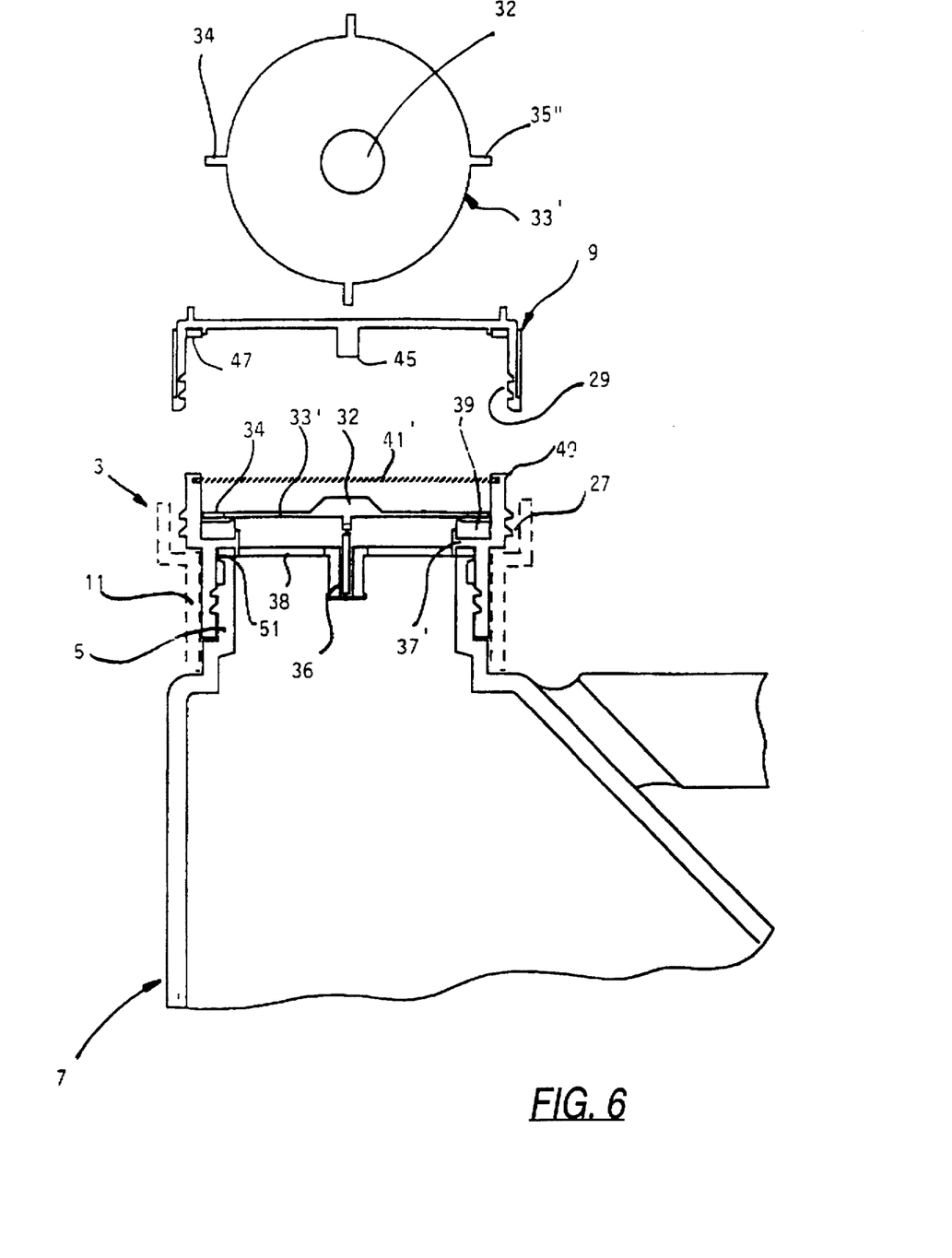
FIG. 6: represents a second embodiment of the closure according to the invention, comprising a light flap valve, the flow control element being omitted.

FIG. 6 shows a different embodiment of the closure according to the present invention, where a flap valve is used instead of a ball valve as previously described. In the example of FIG. 6, the main valve body 3 is screwed on the container neck 5, the essential part of the valve, i.e. the flap valve, being advantageously arranged on the top of the container neck. Tamper evidence means 11 is schematically represented between the main valve body 3, the container 5 and the cap 9. Similarly to the previously described embodiment, a cap 9 is intended to be screwed on the main valve body 3.

The main valve body essentially comprises a valve seat, here a circular shoulder 37', which is part of the main valve body 3 and which is provided with a sealing ring 39, e.g. made of silicon rubber, and a flap valve 33'. As represented in more detail at the top of FIG. 6, the flap comprises radial extensions 35" adapted for sliding movement upon the interior wall of the main valve body 3. Moreover the flap may be provided with apertures 34 on the periphery of the flap at a radial distance from the closure center line which is greater than the radius of the sealing ring 39. The radial extensions 35" also serve as spacers spacing the flap border line from the body wall. In the example of FIG. 6, the flap is retained in the closed position by a spring 36. The spring 36 is retained at its end opposite to the flap, in a yoke or spider 38 arranged within the main valve body 3.

Figure 9:
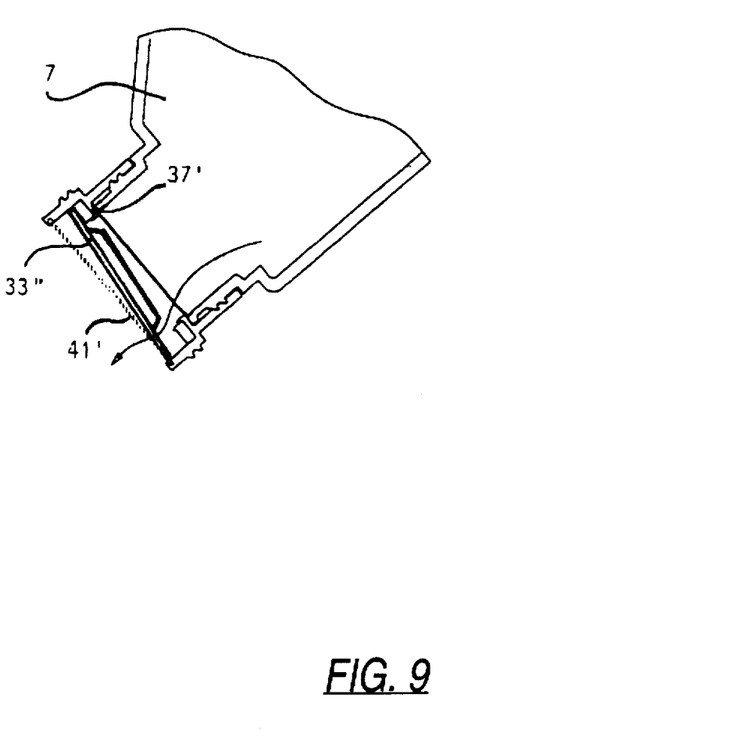
FIG. 9: represents another embodiment of the closure, comprising a weighted flap valve, the flow control element being omitted.

In the case of a heavy flap (FIG. 9), the spring may be omitted. A retention grille 41' is then provided. Such a grille may, however, additionally be provided in the case of a spring retained flap as well.

Figure 8:
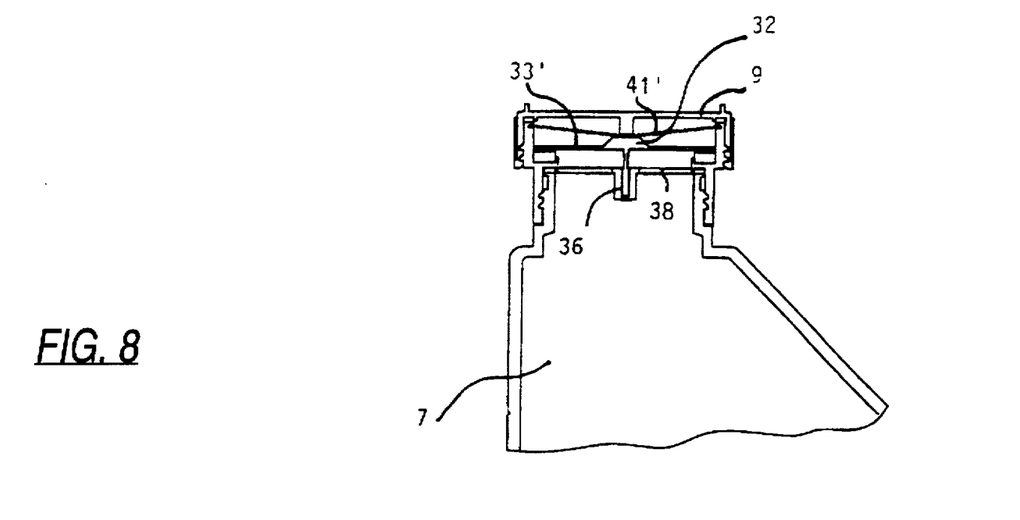
FIG. 8: represents the flap valve closure of FIG. 6 with mounted cap.

The grille 41' may be rigid and provided with an opening, like in FIG. 2, which allows the cap 9 to exert pressure via its abutment means 45 on the flap when screwed on the main valve body. According to the example represented in FIG. 6, the grille 41' is flexible and allows boss 45 of the cap 9 to act on the flap 33', e.g. on a boss 32 thereof (see FIG. 8).

As already taught in relation with FIGS. 2 to 5, there should be provided sealing means between the main valve body 3 and the container neck 5 and between the main valve body 3 and the cap 9. A sealing ring may be arranged at the top of the neck rim 49. The yoke or spider 38 for retention of the spring 36 could advantageously bear a peripheral ring 51, serving as sealing ring. The other sealing means may be provided in the cap 9 as a sealing ring 47.

Figure 7:
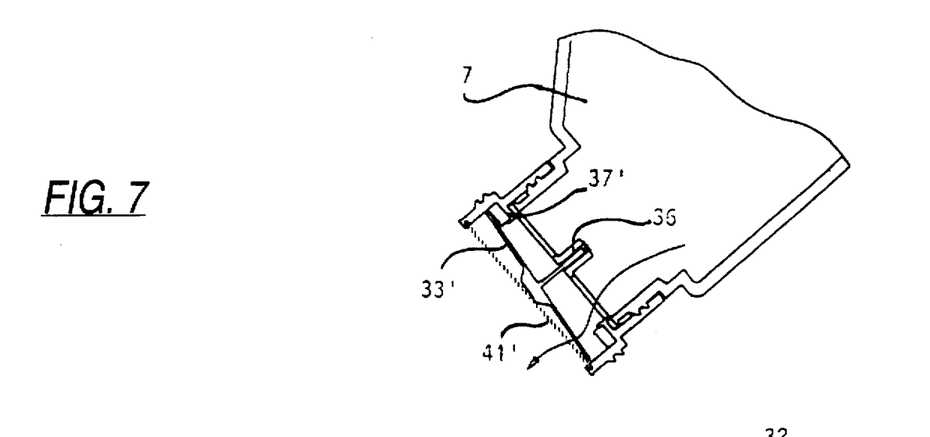
FIG. 7: shows the flap valve in open position allowing product flow.

FIG. 7 more clearly shows how the valve closure of FIG. 6 works. In normal, upright position, the flap 33' is retained in sealing engagement with the valve seat 37'/39 by a spring 36 or, in the case of the spring being omitted, by gravity. The grille 41' prevents the user from opening the flap valve in order to contaminate the container; moreover, the pouring of liquid on the flap valve would only exert more pressure on the flap and hence increase the sealing effect, thus preventing undesired liquid flow into the interior of the container. When the user inverts the container 7, the flap 33' moves away from its seat 37'/39 and opens a fluid passageway according to the arrow of FIG. 7. The flap 33' is retained by the grille 41'. After use, the container is again placed in the normal, essentially upright, position and the cap 9 may be screwed on the main valve body 3, hence pressing the flap 33' firmly against its seat 37'.

In order to reduce the time for emptying a container and to improve the pouring quality with given opening and neck dimensions, a flow control element 51 is arranged upstream of the main valve body. Such a flow control element is designed to maintain an air pathway open right through the valve and to control the entry of air into the container in order to render the product flow more uniform. As a result glugging and splashing of product are minimized, and the actual flow rate that may be achieved is finally higher.

Figure 10:
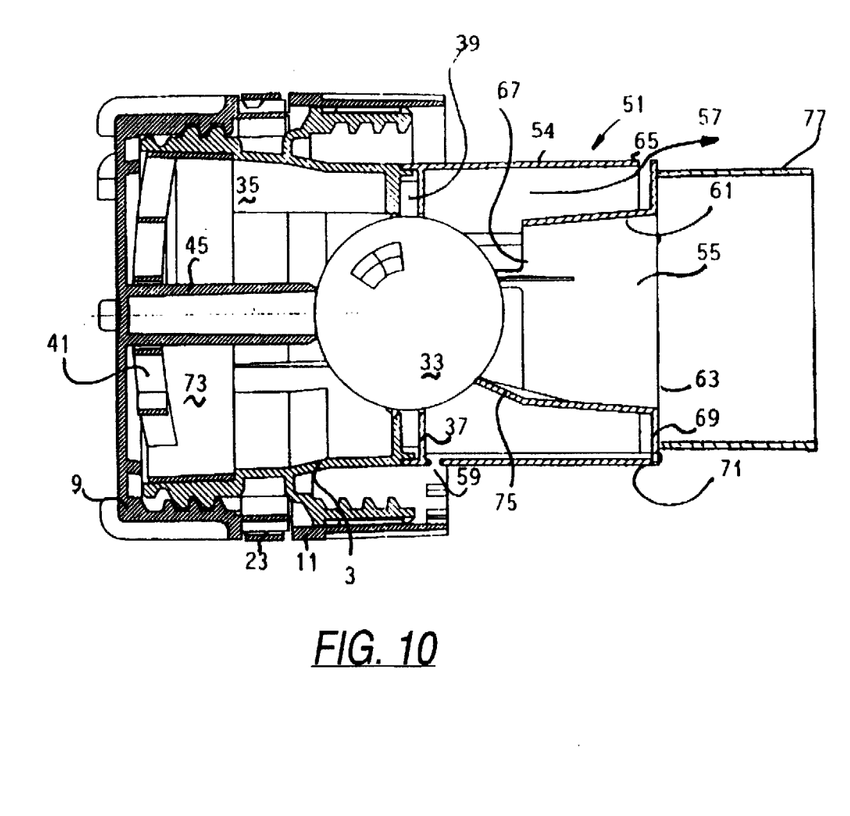
FIG. 10: is a cross-sectional view of a ball valve closure system according to the present invention.

According to the invention and with reference to FIG. 10, the flow control element 51 comprises an essentially cylindrical extension 54 of the main valve body, which extends into the container and which comprises, at the end opposite to the valve body, a product flow orifice 55 and at least one air flow orifice 57. The cylindrical extension 53 may further comprise at the valve body end one or at least two spaced drain holes 59 intended to allow residual amount of product to drain from the container. Such an air flow orifice 57 may consist of one or at least two dip tubes which are spaced around the periphery of the flow control element 51, and which extend into the container.

According to a preferred embodiment, the flow control element 51 is equipped with a hollow essentially conical element 61 directed towards the main valve body and arranged within the said essentially cylindrical extension 53, which comprises a large product inlet orifice 55 allowing for an air flow pathway 57 between the base 63 of said conical element 61 and the end 65 of the cylindrical extension 54, and a product outlet orifice 67 which is smaller than the product inlet orifice 55 and also smaller than the orifice size of the main valve body. The base 63 of said essentially conical element 61 constitutes a transversal skirt 69 which is axially spaced from the end 65 of the cylindrical extension 54 opposite the main valve body. The conical element 61 may be fastened to the cylindrical extension 54 by means of regularly spaced support pillars 71. As may easily be understood from FIG. 10, air may enter into the container during the pouring operation, following arrow (57) whilst the product flows out of the container.

FIG. 10 represents such a flow control element adapted to a ball valve closure according to the invention. It is, however, understood that it may be adapted to any closure embodiment of the present invention.

The skilled person would easily determine, e.g. by straight forward experimentation the optimum dimensions required for the individual elements in order to achieve the expected purpose. With regard to the air flow orifices, too high a size will cause glugging, whereas too small a size will reduce the flow rate. Also the drain holes need to be dimensioned in such a way as to allow easy draining off of the residual product, whereas if they are too large, glugging may again occur. Also, it has been found that the diameter of the cylindrical extension 54 should be made as large as reasonably allowed by the neck of the container. An angle of from 3°–10° for the inclination of the conical wall has appeared appropriate. Also, the product outlet orifice 67 should be at an appropriate distance from the valve seat 37.

When adapted to a closure comprising a ball valve, the essentially conical element may further comprise regularly spaced pegs 75 at the smaller product outlet 67, which serve to locate the ball 33 in the sealing position when the valve is closed.

While the above embodiment is very efficient for pouring angles 53 up to 150°–160°, it may be desirable to provide a closure which allows for pouring in the fully inverted position with reduced glugging. Such a closure may additionally comprise a shield ring 77 arranged on the transversal skirt 69 in axial extension thereof. Said shield ring 77 may prevent the air which enters the container through the air flow orifice 57 from being entrained with the product flowout through the product flow orifice 55.

We claim:

1. A reusable closure for removable attachment within the neck of a returnable and reusable container for storing liquid, comprising:
   a) a valve body for attachment to the inside surface of the neck of said container;
   b) a ball disposed within said valve body;
   c) a valve seat disposed within said valve body, said valve seat having a circular opening defining a resting position for said ball while said container is in a substantially upright position, said ball rolling away from said resting position when said container is in an inclined or inverted position;
   d) sealing means around said valve seat for forming a tight seal between said ball and said valve seat while said container is in a substantially upright position;
   e) retention means for keeping said ball disposed within said valve body while said container is in an inclined or inverted position;
   f) a cylindrical flow control element comprising a first end connected to said valve body and a second end extending into said container;
   g) a hollow conically Shaped element having a tapered end, a wide end, and an inner passageway, said hollow conically shaped element arranged within said cylindrical flow control element so as to define an outer passageway between said hollow conically shaped element and said cylindrical flow control element, said wide end being adjacent to said second end of said cylindrical flow control element, and said tapered end directed toward said neck of said container,
   said inner passageway of said hollow conically shaped element comprising a conduit for flowing liquid, said tapered end of said hollow conically shaped element having an opening defining a liquid outlet orifice adjacent to said circular opening of said valve seat, said outer passageway comprising an air flow pathway;
   h) a transversal skirt radially extending around said base of said conically shaped element to define a bridge between said base of said conically shaped element and the second end of said cylindrical flow control element, said transversal skirt including at least one hole defining an air flow orifice.

2. The reusable closure of claim 1 further comprising at least three spaced ribs disposed within said valve body to define a track for guiding said ball along said valve body.

3. The reusable closure of claim 1, further comprising:
   a) a cap sealingly engageable to said main valve body;
   b) an abutment means protruding inwardly from said cap for maintaining said ball in firm sealing engagement with said valve seat, in any position of said container.

4. The reusable closure of claim 3, further comprising at least three spaced ribs disposed within said valve body to define a track for guiding said ball along said valve body.

5. The reusable closure of claim 3, further comprising tamper evidence means disposed between said valve body and said neck of said container for providing evidence in case of tampering with said closure.

6. The reusable closure of claim 5, further comprising at least three spaced ribs disposed within said valve body to define a track for guiding said ball along said valve body.

7. The reusable closure of claim 1, further comprising a cylindrical shield ring disposed on said transversal skirt and extending inwardly within said container.

8. The reusable closure of claim 7, further comprising at least three spaced ribs disposed within said valve body to define a track for guiding said ball along said valve body.

9. The reusable closure of claim 7, further comprising:

a) a cap sealingly engageable to said main valve body;

b) an abutment means protruding inwardly from said cap for maintaining said ball in firm sealing engagement with said valve seat, in any position of said container.

10. The reusable closure of claim 9, further comprising at least three spaced ribs disposed within said valve body to define a track for guiding said ball along said valve body.

11. The reusable closure of claim 9, further comprising tamper evidence means disposed between said valve body and said neck of said container for providing evidence in case of tampering with said closure.

12. The reusable closure of claim 11, further comprising at least three spaced ribs disposed within said valve body to define a track for guiding said ball along said valve body.

* * * * *